United States Patent
Hodge et al.

(10) Patent No.: US 7,935,193 B2
(45) Date of Patent: May 3, 2011

(54) METHOD OF OPERATING A WHEEL WASHING ASSEMBLY

(75) Inventors: Robert J. Hodge, Medical Lake, WA (US); Anthony Analetto, Weston, FL (US); Salvatore Fazio, Fort Lauderdale, FL (US)

(73) Assignee: Sonny's Enterprises, Inc., Tamarac, FL (US)

( * ) Notice: Subject to any disclaimer, the term of this patent is extended or adjusted under 35 U.S.C. 154(b) by 0 days.

(21) Appl. No.: 12/693,814

(22) Filed: Jan. 26, 2010

(65) Prior Publication Data

US 2010/0122714 A1 May 20, 2010

Related U.S. Application Data

(62) Division of application No. 11/701,716, filed on Feb. 2, 2007, now Pat. No. 7,677,258.

(51) Int. Cl.
*B08B 1/02* (2006.01)
*B08B 3/04* (2006.01)

(52) U.S. Cl. ............................... 134/32; 134/34; 134/45

(58) Field of Classification Search .................. None
See application file for complete search history.

(56) References Cited

U.S. PATENT DOCUMENTS

| | | |
|---|---|---|
| 2,692,214 A | 10/1954 | Hurst |
| 3,304,565 A | 2/1967 | Fuhring |
| 3,662,417 A | 5/1972 | Führing et al. |
| 3,729,763 A | 5/1973 | Coley |
| 3,777,326 A | 12/1973 | Haley et al. |
| 3,783,465 A * | 1/1974 | Takeuchi ..................... 15/53.2 |
| 3,913,162 A * | 10/1975 | Parkin ............................ 15/53.4 |
| 3,915,179 A | 10/1975 | Casson |
| 4,043,286 A | 8/1977 | Doty |
| 4,198,722 A | 4/1980 | Ennis |
| 4,651,925 A | 3/1987 | Harris |
| 4,694,523 A | 9/1987 | Van Brakel |
| 4,830,033 A | 5/1989 | Hanna |
| 5,123,136 A | 6/1992 | Belanger et al. |
| 5,188,293 A * | 2/1993 | Burton ............................. 239/1 |
| 5,497,797 A | 3/1996 | Meyer, III |
| 5,778,908 A | 7/1998 | Shelstad |
| 6,270,586 B1 * | 8/2001 | Soble ............................. 134/32 |
| 6,270,856 B1 | 8/2001 | Hendewerk et al. |
| 7,243,665 B1 | 7/2007 | Turner et al. |
| 2009/0250084 A1 * | 10/2009 | Belanger et al. ............. 134/123 |

FOREIGN PATENT DOCUMENTS

DE 3812476 C1 6/1989

* cited by examiner

*Primary Examiner* — Michael Kornakov
*Assistant Examiner* — Nicole Blan
(74) *Attorney, Agent, or Firm* — Laurence A Greenberg; Werner H. Stemer; Ralph E. Locher

(57) ABSTRACT

A wheel washing assembly contains a machine frame, a pendulum assembly pivotably supported on the machine frame, and two washing manifolds, including a first washing manifold and a second washing manifold, attached to the pendulum assembly. Each of the washing manifolds has a nozzle assembly for ejecting water at a wheel to be washed. The washing manifolds are pivotable between a start washing position and an end washing position by an automatic motion of the pendulum assembly. The washing manifolds further automatically track the wheels to be washes by a motion of one of the wheels.

7 Claims, 5 Drawing Sheets

METHOD OF OPERATING A WHEEL WASHING ASSEMBLY

CROSS-REFERENCE TO RELATED APPLICATION

This is a divisional application of application Ser. No. 11/701,716, filed Feb. 2, 2007 now U.S. Pat. No. 7,677,258; the prior application is herewith incorporated by reference in its entirety.

BACKGROUND OF THE INVENTION

Field of the Invention

The invention relates, generally, to wheel washing assemblies and more specifically, it relates to an automated wheel washing assembly for an automated vehicle wash or carwash. The invention further relates to a method of operating a wheel washing assembly.

In the past, automatic wheel washers commonly scrubbed the hubcap and tire sidewall areas of the wheel with a rotating brush. However on newer vehicles, this is objectionable because the scrubbing action mars the surface finish on the hubcaps and rims. Accordingly, there is a need for a touchless car wheel washer.

The cleaning of the wheels of a vehicle in a drive-through wash system has always been a difficult task to achieve automatically. While there have been numerous attempts to automatically wash vehicle wheels at a wheel cleaning station, the reliability and the cost of such devices have inhibited their general acceptance and usage in the industry. Today, most car washes have at least supplemented the washing of the vehicle wheels by manually spraying the vehicle wheels with a low-pressure jet of water from a wand manipulated by one or more attendants. However, this is not an option for a fully automated carwash with no attendants.

A more common approach is to spray a low pressure, i.e. less than 100 psi, stream of soapy water at the vehicle wheel in order to dislodge dirt and debris. The difficulty arises in effectively spraying the entire wheel surface in a relatively short segment of the drive-through washing system. A common attempt is to utilize a spray of liquid to clean wheels which is provided by a plurality of longitudinally spaced apart, stationary and sequentially operated nozzles. However, the low-pressure cleaning was not effective as the wheels passed the stationary spaced nozzles to quickly.

U.S. Pat. No. 4,830,033 teaches a wheel washing apparatus using a series of sequentially activated nozzles. The nozzles provide a high-pressure, 600 to 900 psi, stream of liquid dispensed from a series of longitudinally spaced and sequentially activated nozzles. These nozzles are mounted atop a parallelogram type tire washing apparatus so that the nozzles can be spaced at a uniform distance from the vehicle wheel regardless of vehicle width. However, once again the nozzles do not follow the wheel along the transport path.

A major expense of wheel washers in automated carwashes relates to the relative expense of the drive assembly formed of hydraulically driven cylinders for positioning the wheel washing assembly and to allow it to follow a wheel as it traverses through the car wash rather than be formed of stationary, spaced nozzles. In addition, to being complicated to construct, the drive assembly is subject to expensive maintenance and repair costs as many mechanical and hydraulic related moving parts are involved to allow the wheel washing assembly to follow the wheel. In addition, the tracking of the wheel is complicated as the conveyance speeds may be varied.

The need persists to develop a wheel washing assembly having a contactless sprayer that is driven by a simple mechanical drive for tracking the wheel and which does not have the complicated and expensive tracking mechanism. In addition to reduced manufacturing costs, a wheel washing assembly with the least maintenance needs and repair requirements is desirable.

SUMMARY OF THE INVENTION

It is accordingly an object of the invention to provide a wheel washing assembly for an automated carwash and a method of operating the wheel washing assembly that overcome the herein-mentioned disadvantages of the heretofore-known devices and methods of this general type, which is less complex than existing systems and easier to maintain and operate.

With the foregoing and other objects in view there is provided, in accordance with the invention, a wheel washing assembly. The wheel washing assembly contains a machine frame, a pendulum assembly pivotably supported on the machine frame, and two washing manifolds, including a first washing manifold and a second washing manifold, attached to the pendulum assembly. Each of the washing manifolds has a nozzle assembly for ejecting water at a wheel to be washed. The washing manifolds are pivotable between a start washing position and an end washing position by an automatic motion of the pendulum assembly. The washing manifolds further automatically track the wheel by a motion of one of the wheels. This allows a continuous washing of the wheel as it is being tracked.

In accordance with an added feature of the invention, a pendulum base frame is provided and has a recess formed therein and is disposed beneath the machine frame, the first washing manifold follows along a track defined by the pendulum base frame.

In accordance with an additional feature of the invention, the first washing manifold has a roller assembly which falls fully into the recess for allowing the wheel to traverse fully over and past the roller assembly, and upon the wheel fully traversing past the roller assembly, the pendulum assembly automatically initiates a pivoting motion from the end washing position to the start washing position due to a force of gravity and a position of the pendulum assembly.

In accordance with another feature of the invention, the nozzle assembly includes a central nozzle and four spinning nozzles rotating around the central nozzle.

Ideally, the pendulum assembly is formed of a frame containing main arms and lower arms having an articulated connection to the main arms. Each of the lower arms supports one of the washing manifolds and is height adjustable due to the articulated connection and allows the roller assembly to sink into the recess. The pendulum assembly further has a counter weight configured for controlling a motion of the pendulum assembly. Preferably, the machine frame and pendulum assembly are formed of metal tubing having a square shaped cross section.

In accordance with a further feature of the invention, bearing blocks are provided with one of the bearing blocks disposed on opposite sides of the machine frame for supporting the pendulum assembly in a pivotal manner.

In accordance with yet another feature of the invention, only a single pump for pumping water to the nozzle assembly is necessary.

In accordance with another further feature of the invention, the first washing manifold has a roller assembly which is pushed by one of the wheels starting around the start washing position and thus allows the washing manifolds to track the wheels due to the speed of the one wheel. A distance between the start washing position and the end washing position is at least four feet which allows the nozzle assembly to continuously eject the water at the wheels to be cleaned as the nozzle assembly moves with the wheels.

With the foregoing and other objects in view there is provided, in accordance with the invention, a method of washing wheels of a vehicle. The method includes providing a wheel washing assembly containing a pendulum assembly pivotably supported on a machine frame, and two washing manifolds, including a first washing manifold and a second washing manifold, attached to the pendulum assembly. Each of the washing manifolds has a nozzle assembly for ejecting water at the wheel to be washed, and the first washing manifold has a roller assembly. The vehicle is moved through the wheel washing assembly with one of the wheels engaging and pushing the roller assembly, beginning at a start position, causing an automatic tracking of two of the wheels by the first and second washing manifolds, respectively. Water is ejected at the two wheels being tracked by the first and second washing manifolds. The wheel will drive over the roller assembly at an end position. Subsequently, the first and second washing manifolds are pivoted back to the start position via the pendulum assembly.

Other characteristic features of the invention are set forth in the appended claims.

Although the invention is illustrated and described herein as embodied in a wheel washing assembly for an automated carwash and a method of operating the wheel washing assembly it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of specific embodiments when read in connection with the accompanying drawings.

DESCRIPTION OF THE INVENTION

Figure 1:
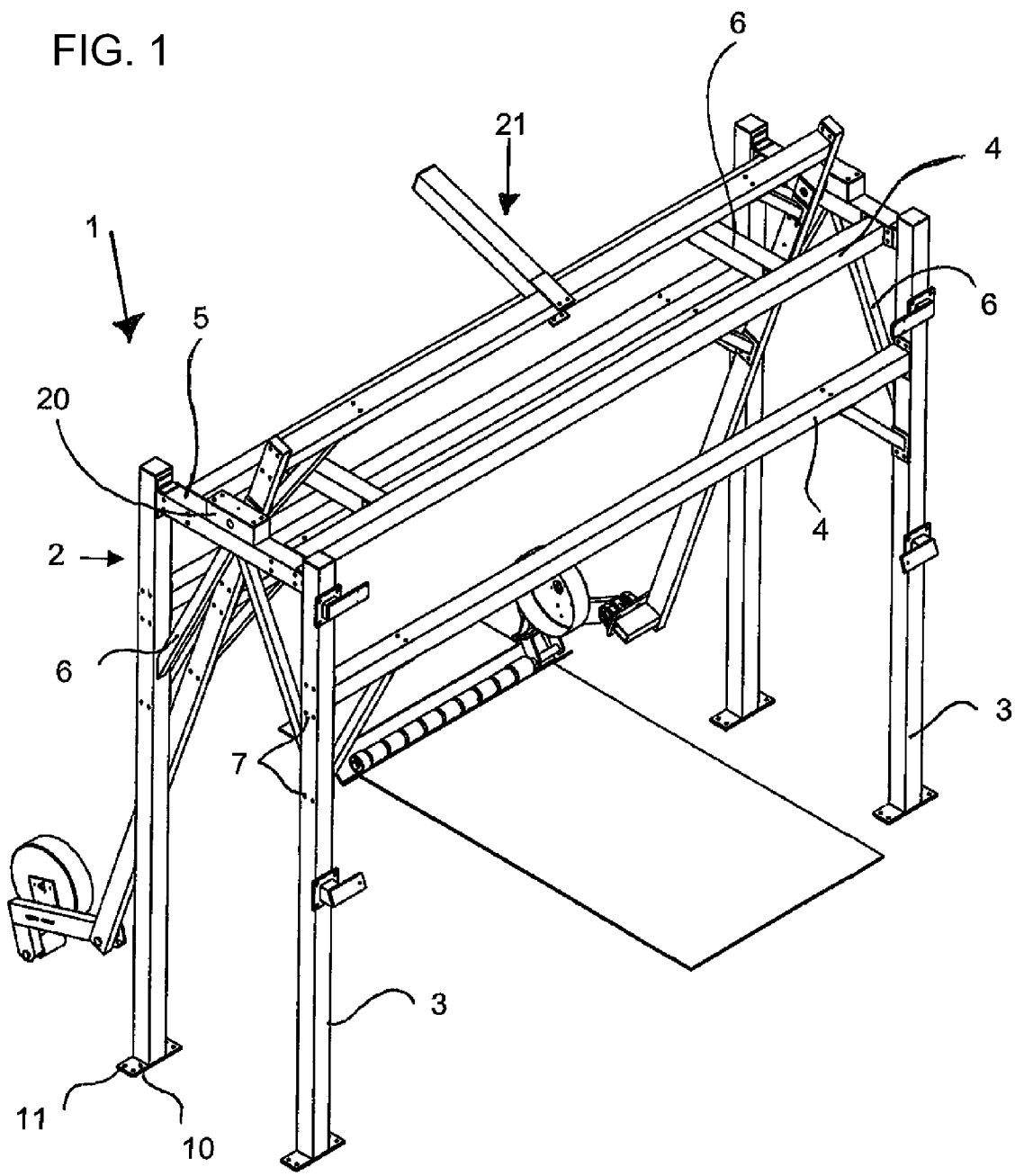
FIG. 1 is a diagrammatic, front perspective view of a wheel washing assembly according to the invention.

In all the figures of the drawing, sub-features and integral parts that correspond to one another bear the same reference symbol in each case. Referring now to the figures of the drawings in detail and first, particularly, to FIG. 1 thereof, there is shown a wheel washing assembly 1 for installation in a non-illustrated automatic car wash. The wheel washing assembly 1 has a frame 2 formed of four posts 3, four cross braces 4, two transverse cross braces 5, and a plurality of standard braces 6 all connected to each other for forming the frame 2. The frame components 3-6 are welded and/or fastened via fasteners 7 to each other. The frame components 3-6 are ideally formed of aluminum, metal, metal alloys or composite materials and are shown to be formed from tubing having a square cross sectional shape. The frame components 3-6 can be of any shape as long as it has the necessary structural strength and balance but ideally has the square cross sectional shape as these components are cost effective to manufacture.

At a base of each of the posts 3 is an attachment bracket 10 containing a plurality of holes 11 for fastening the wheel washing assembly 1 to a floor or a base of the automatic carwash. The frame 2 is shown here with four posts 3 but can easily be extended by the addition of two to four more central posts 3 to provide a longer wheel cleaning area.

Figure 4:
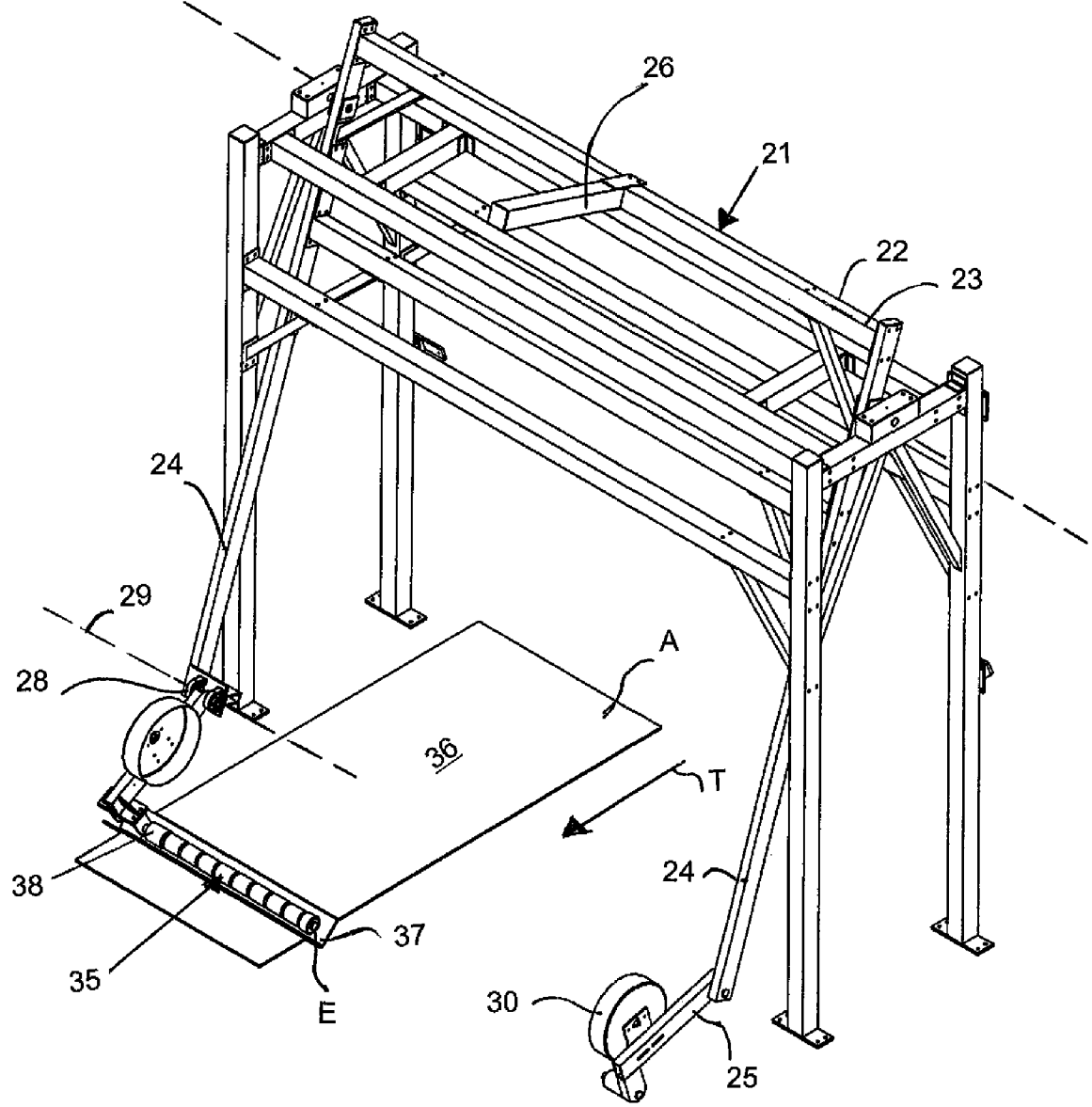
FIG. 4 is a diagrammatic, rear perspective view of the wheel washing assembly.

Disposed on top of the frame 2 are two oppositely positioned bearing blocks 20 for supporting a pendulum assembly 21. As best shown in FIG. 4, the pendulum assembly 21 has a pendulum frame 22 formed of one cross member 23, two main arms 24 extending from the cross member 23, two lower arms 25 extending from the main arms 24, and one counter weight 26 attached approximately centrally on the cross member 23. Each of the main arms 24 is mounted in one of the bearing blocks 20 and can swing or pivot about a central axis 27 of the bearing block 20. The lower arms 25 are pivotably connected to the main arms 24, via a clevis type assembly 28 that allows the lower arms 25 to pivot or rotate about an axis of rotation 29. In this manner, the lower arms 25 can be raised and lowered as needed.

Figure 2:
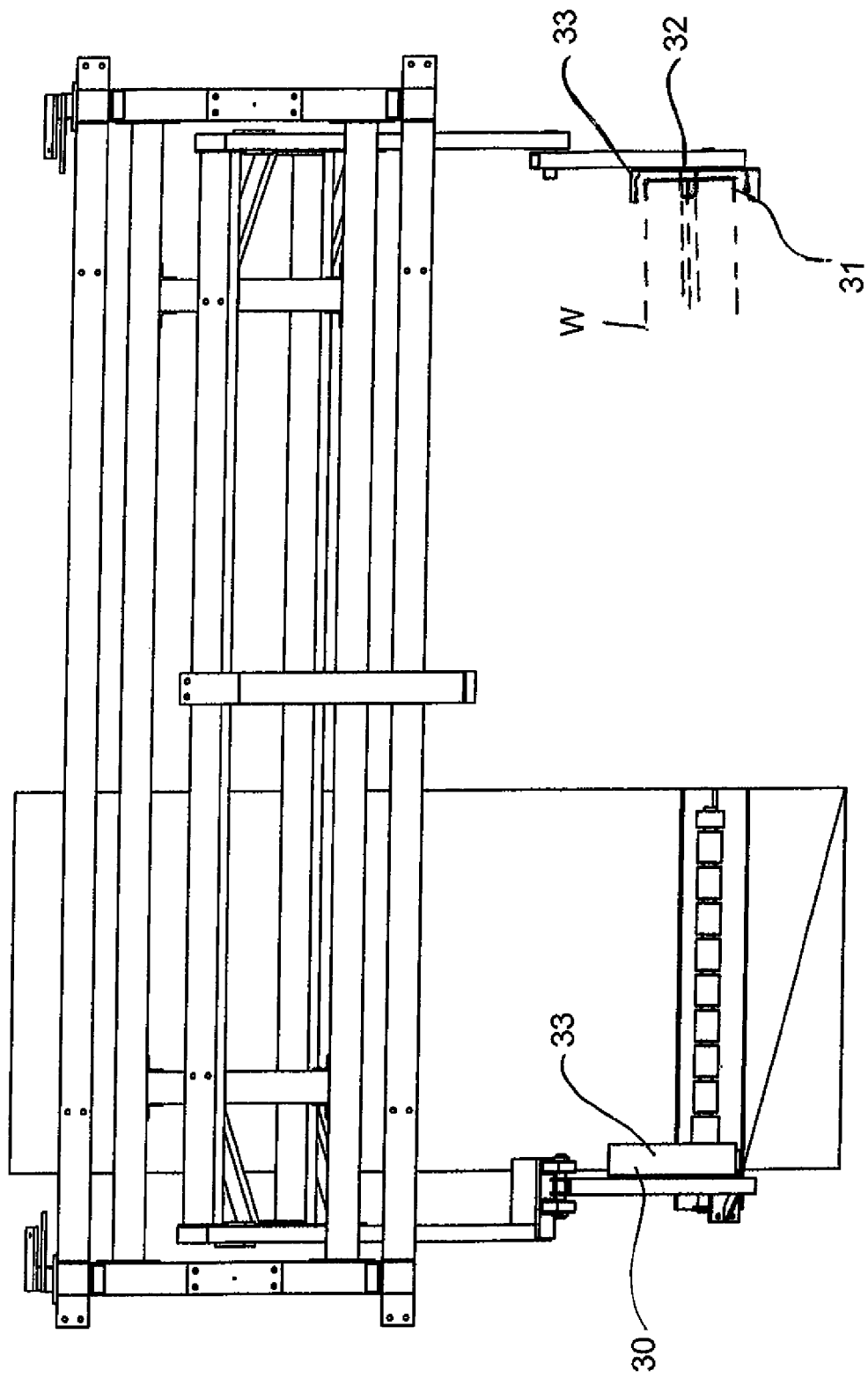
FIG. 2 is a diagrammatic, plan view of the wheel washing assembly.

Attached to each of the lower arms 25 is a spinning wash manifold 30 containing four spinning zero-degree plus nozzles 31 and one turbo nozzle 32 to deliver the necessary water impact to loosen even the most difficult brake dust and other road grime from wheels as best seen in FIG. 2. In FIG. 2, a manifold housing 33 containing the nozzles 31 and 32 has been cut away on the right side of FIG. 2 so that the nozzles 31 and 32 are visible. The spinning nozzles 31 rotate or spin about the central stationary nozzle 32 as all of the nozzles eject water W at a desired pressure being either low pressure, less than 100 psi, or high pressure being greater than 100 psi, ideally 600-900 psi.

Figure 3:
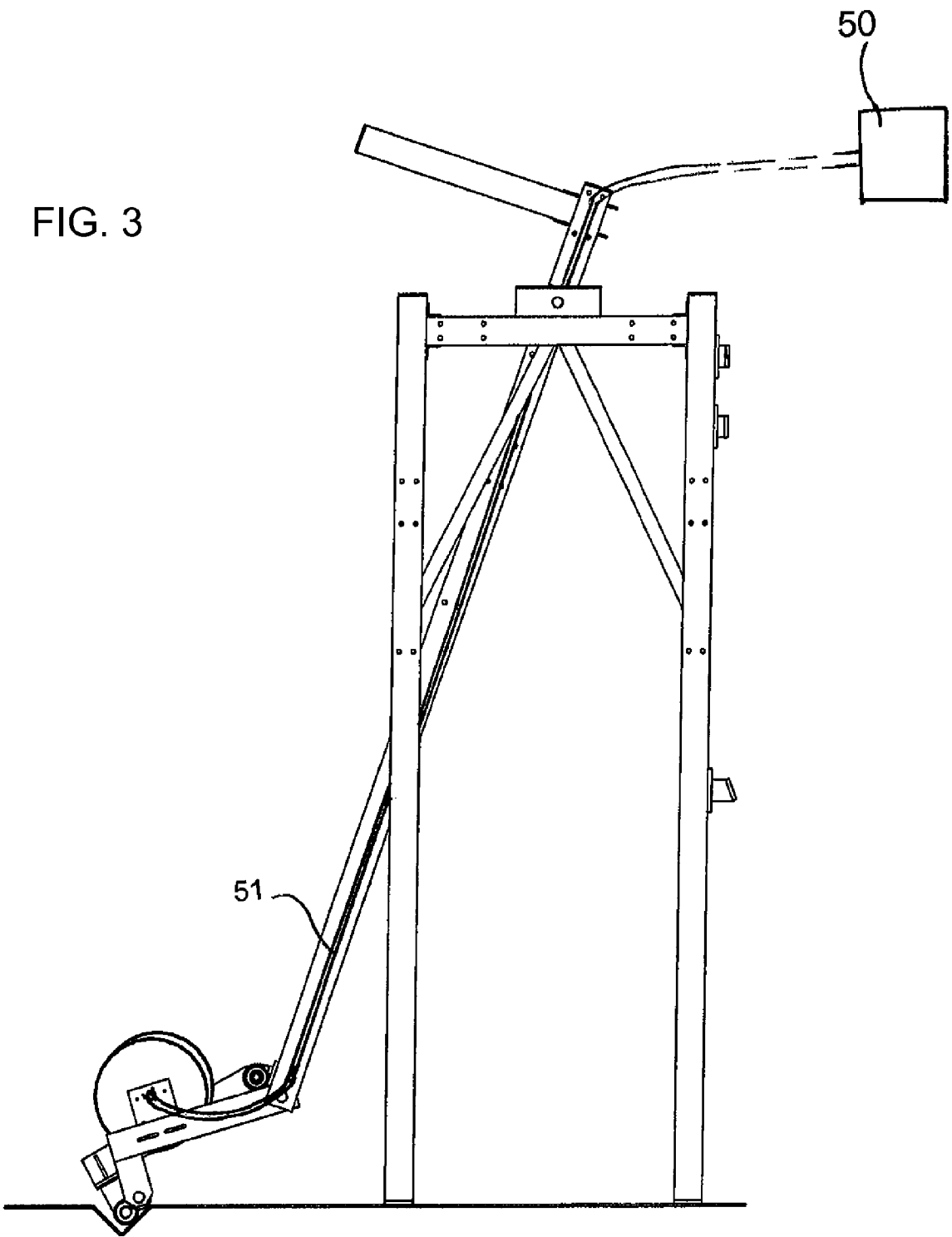
FIG. 3 is a diagrammatic, side view of the wheel washing assembly.
Figure 5:
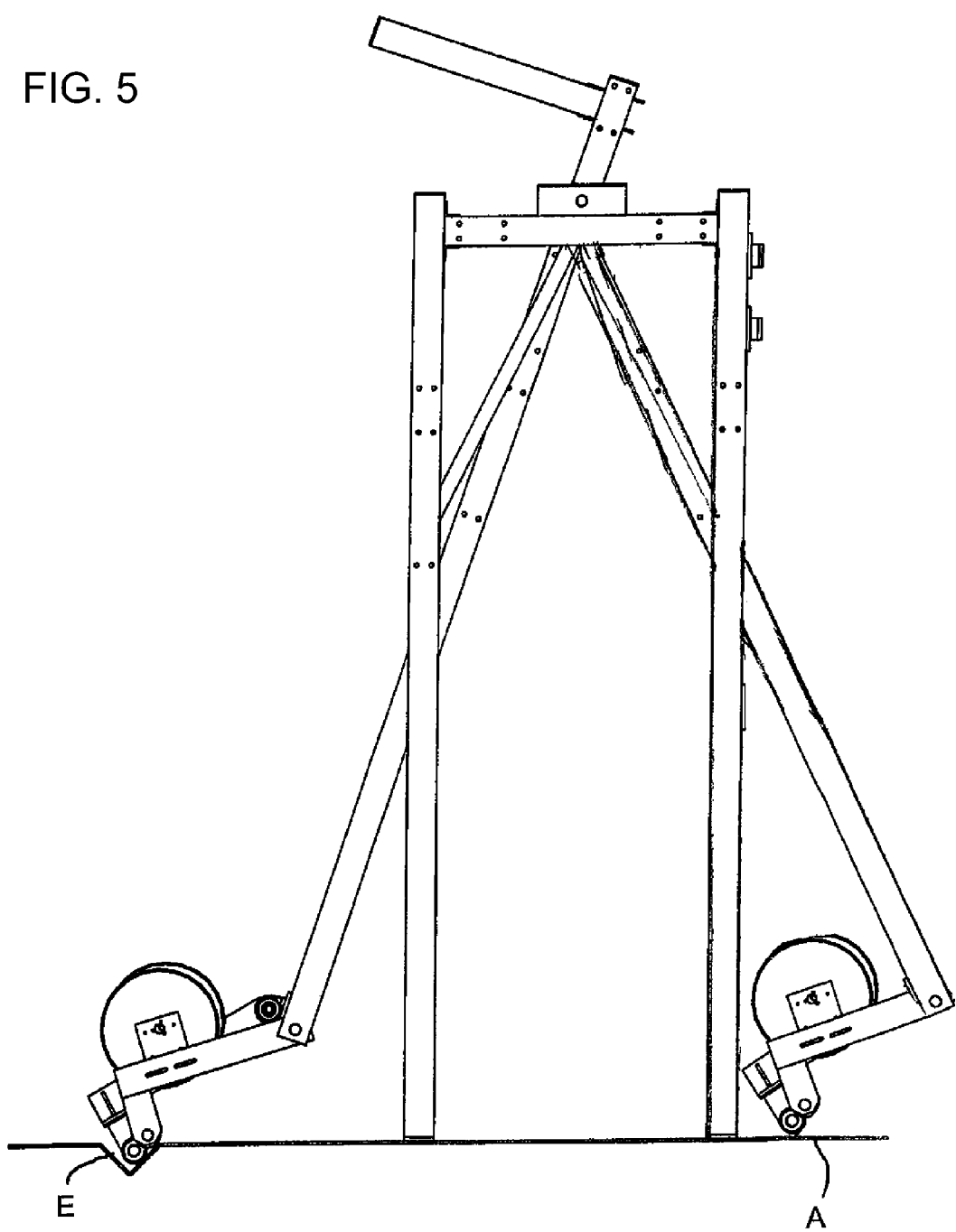
FIG. 5 is a diagrammatic, side view of the wheel washing assembly showing a washing manifold in a start position and an end position.

Attached to one of the lower arms 25 is a pendulum roller assembly 35 that is guided above and/or along a pendulum base plate 36 (FIG. 4). At an end of the pendulum base plate 36 is a recess 37 that receives the pendulum roller assembly 35. Upon entering an entry or starting point A of the wheel washing assembly 1 defined at the front of the pendulum base plate 36, a front wheel of a vehicle runs into rollers 38 of the pendulum roller assembly 35. The front wheel pushes the pendulum roller assembly 35 forward along the pendulum base plate 36 in a direction of travel T. The initial movement of the pendulum roller assembly 35 causes a diagrammatically illustrated pump assembly 50 to supply water, via water lines 51, to the four spinning nozzles 31 and the one turbo nozzle 32 for both the left and right spinning wash manifolds 30 (see FIG. 3). The four spinning nozzles 31 spin about the middle turbo nozzle 32 and all five nozzles eject a pressurized stream of water W at the wheel and tire for cleaning the wheel and tire. The spinning wash manifold 30 and the associated nozzles 31, 32 follow the wheel perfectly along the pendulum base plate 36 because it is pushed by the front wheel of the vehicle acting on the pendulum roller assembly 35. Therefore, there is no need to make adjustments for different vehicle conveyor speeds as the vehicle wheel provides an automatic speed adjustment. Therefore, complicated tracking or controller systems can be dispensed with. As the front wheel and therefore the pendulum roller assembly 35 reach the recess 37 at the end position E of the pendulum base plate 36, the pendulum roller assembly 35 sinks into the recess 37 and the front wheel rolls over the pendulum roller assembly 35. After the front wheel passes over the pendulum roller assembly 35 housed in the recess 37, the pendulum roller assembly 35 automatically swings back to the entry point A under a pendulum action of the pendulum assembly 21. For a further understanding of the pendulum motion, FIG. 5 shows both the entry point A and the end point E of the pendulum action. It is noted the FIG. 5 is highly diagrammatic and is provided only for showing the two positions A, E and is not fully illustrated in the upper region of the drawing. Upon falling into the recess 37, the water pump 50 is optionally signaled to stop providing water W and therefore the spinning wash manifold 30 shuts down. In another embodiment, the water flow is continuous and not turned off in anticipation of the rear wheels.

It is noted that the water supply system including the pump 50, non-illustrated actuators and valves and the water lines 51 are only figuratively illustrated as they are known component parts. However, it is noted that a single pump 50 is all that is necessary for supplying water to the two spinning wash manifolds 30 which is not common in known wheel washing assemblies.

The pendulum action itself raises and lowers the spinning wash manifold 30 to the proper heights and ensures full coverage of various wheel heights. This is allowed to occur because of the articulated connection of the lower arm 25 to main arm 24 of the pendulum assembly 21. The spinning wash manifold 30 perfectly tracks each wheel, following it with a pressurized stream of water along the extent of the pendulum base plate 36, thus providing an extended washing period with a pressurized circular cleaning motion of the spinning nozzles 31 and the turbo nozzle 32. It is noted that different water pressures can be provided to the different nozzles 31 and 32 for providing different cleaning actions. Furthermore, a travel path of the spinning wash manifold 30 is approximately five feet along the pendulum base plate 36 but the travel path can easily be varied to 4, 5, 6, 7, 8, 9 or greater feet depending on the frame and pendulum assembly structure in addition to the type of vehicle to be washed.

Next a rear wheel of the vehicle pushes the pendulum roller assembly 35 and initiates a washing cycle for the rear wheels. After the rear wheel pass over the recessed pendulum roller assembly 35, the pendulum roller assembly 35 once again automatically swings back to the entry point A under a pendulum action of the pendulum assembly 21.

As can be immediately recognized, the simple mechanical pendulum based configuration requires little maintenance, automatically adjusts to any conveyor speed, and automatically sets up for the entry of the next wheel. In other words, no complicated electronic controller assembly is required for the wheel washing assembly as it is based on a simple, automatic pendulum action. As compared to the prior art, no complicated hydraulically driven cylinders and controllers are required for positioning the spinning wash manifolds 30 and to allow the spinning wash manifolds 30 to perfectly track incoming wheels. Not only are the maintenance costs greatly reduced but construction costs are considerably lower than the prior art wheel washing assemblies due to the simple, yet highly affective pendulum assembly 21.

The invention claimed is:

1. A method of washing wheels of a vehicle, which comprises the steps of:
   providing a wheel washing assembly containing:
      a pendulum assembly pivotably supported on a machine frame and freely swinging about a pivot point; and
      two washing manifolds, including a first washing manifold and a second washing manifold, attached to the pendulum assembly, each of the washing manifolds having a nozzle assembly for ejecting water at the wheel to be washed, the first washing manifold having a roller assembly;
   moving the vehicle through the wheel washing assembly with one of the wheels engaging and pushing the roller assembly, beginning at a start position, causing an automatic tracking of two of the wheels by the first and second washing manifolds, respectively;
   ejecting water at the two wheels being tracked by the first and second washing manifolds;
   driving over the roller assembly at an end position; and
   subsequently pivoting the first and second washing manifolds back to the start position via the pendulum assembly.

2. The method according to claim 1, which further comprises lowering the roller assembly into a recess at the end position for allowing the wheel to transverse over the roller assembly.

3. The method according to claim 1, which further comprises ejecting the water at the wheels with a swirling or rotating motion.

4. The method according to claim 1, which further comprises pumping water to the nozzle assembly upon movement of the roller assembly by the wheel.

5. The method according to claim 1, which further comprises continuously tracking the two wheels by the first and second washing manifolds for at least four feet.

6. The method according to claim 1, which further comprises:
   forming the nozzle assembly with a central nozzle and further nozzles spinning around the central nozzle; and
   providing different water pressures to the central nozzle than the further nozzles.

7. A method of washing wheels of a vehicle, which comprises the steps of:
   providing a wheel washing assembly containing a freely swinging pendulum assembly pivotably supported on a machine frame and two washing manifolds, including a first washing manifold and a second washing manifold, attached to the pendulum assembly, each of said washing manifolds having a nozzle assembly for ejecting water at the wheel to be washed, the first washing manifold having a roller assembly;
   moving the vehicle through the wheel washing assembly with one of the wheels engaging and pushing the roller assembly, beginning at a start position, causing an automatic tracking of two of the wheels by the first and second washing manifolds, respectively; and
   ejecting water at the two wheels being tracked by the first and second washing manifolds.

\* \* \* \* \*